United States Patent
Ochiai et al.

(10) Patent No.: US 7,267,632 B2
(45) Date of Patent: Sep. 11, 2007

(54) CONTROL OF BELT-DRIVE CONTINUOUSLY VARIABLE TRANSMISSION

(75) Inventors: Tatsuo Ochiai, Fuji (JP); Hideki Oshita, Fuji (JP); Hiroyasu Tanaka, Fuji (JP); Shouji Watanabe, Fuji (JP)

(73) Assignee: JATCO Ltd, Shizuoka (JP)

( * ) Notice: Subject to any disclaimer, the term of this patent is extended or adjusted under 35 U.S.C. 154(b) by 721 days.

(21) Appl. No.: 10/825,112

(22) Filed: Apr. 16, 2004

(65) Prior Publication Data
US 2004/0209719 A1    Oct. 21, 2004

(30) Foreign Application Priority Data
Apr. 18, 2003   (JP)   ............... 2003-114032

(51) Int. Cl.
*F16H 61/662*   (2006.01)
(52) U.S. Cl. .................... 477/45; 477/107
(58) Field of Classification Search .......... 477/44, 477/45, 107
See application file for complete search history.

(56) References Cited

U.S. PATENT DOCUMENTS

| | | | |
|---|---|---|---|
| 4,680,987 A * | 7/1987 | Morimoto | 477/39 |
| 5,010,989 A * | 4/1991 | Huntley | 477/39 |
| 5,042,325 A | 8/1991 | Sawasaki et al. | |
| 6,530,860 B2 * | 3/2003 | Ui | 477/45 |
| 6,829,528 B1 * | 12/2004 | Kang et al. | 701/51 |
| 2001/0023216 A1 | 9/2001 | Bolz et al. | |
| 2002/0004437 A1 | 1/2002 | Asayama et al. | |

FOREIGN PATENT DOCUMENTS

JP    11-139184 A    5/1999

* cited by examiner

*Primary Examiner*—Ha D. Ho
(74) *Attorney, Agent, or Firm*—Foley & Lardner LLP

(57) ABSTRACT

A controller (50) controls the supply of oil pressure to a primary pulley (41) and a secondary pulley (42) of a belt-drive continuously variable transmission (1) in accordance with the depression amount of an accelerator pedal (81) of a vehicle. When slippage is detected in a V-belt (43) that is wrapped around the primary pulley (41) and secondary pulley (42), the controller (50) reduces the output torque of an engine (70) of the vehicle to stop the V-belt (43) from slipping. Meanwhile, damage to the V-belt (43) caused by slippage is prevented by reducing the oil pressure supply to the secondary pulley (42).

12 Claims, 8 Drawing Sheets

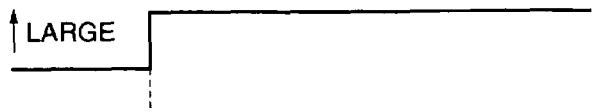
FIG. 9A  TVO
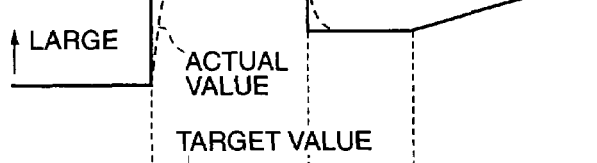
FIG. 9B  LINE PRESSURE
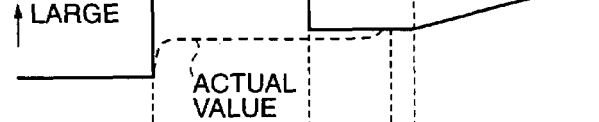
FIG. 9C  SECONDARY PRESSURE
FIG. 9D  ENGINE TORQUE LIMIT VALUE
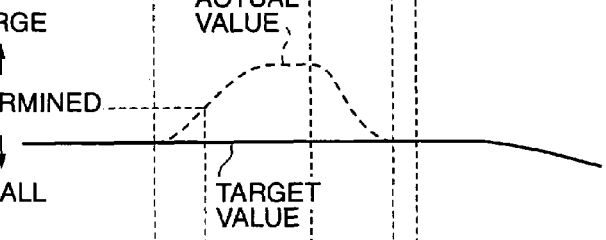
FIG. 9E  SPEED RATIO
FIG. 9F  BELT SLIPPAGE FLAG
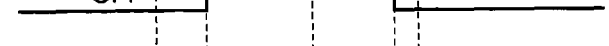
FIG. 9G  BELT SLIPPAGE TIME COUNTER
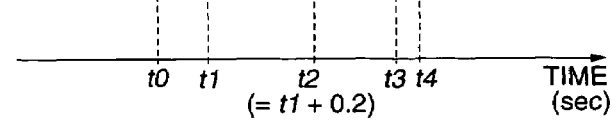

FIG. 10A TVO
FIG. 10B LINE PRESSURE
FIG. 10C SECONDARY PRESSURE
FIG. 10D ENGINE TORQUE LIMIT VALUE
FIG. 10E SPEED RATIO
FIG. 10F BEL ALUE FLAG
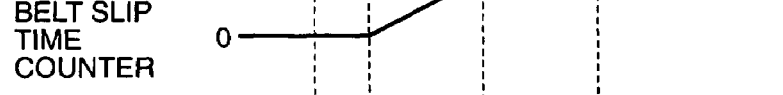
FIG. 10G BELT SLIP TIME COUNTER

CONTROL OF BELT-DRIVE CONTINUOUSLY VARIABLE TRANSMISSION

FIELD OF THE INVENTION

This invention relates to the control of a belt-drive continuously variable transmission.

BACKGROUND OF THE INVENTION

A belt-drive continuously variable transmission for use in a vehicle comprises a primary pulley which inputs engine torque, a secondary pulley which is connected to the drive wheel, and a V-belt which is wrapped around the pulleys. The V-belt engages with grooves formed respectively in the primary pulley and secondary pulley. The width of the grooves varies according to the oil pressure that is applied to the primary pulley and secondary pulley, and the radius of contact between the V-belt and each pulley varies accordingly. By means of these variations in the contact radius, the speed ratio of the pulleys changes continuously.

Control of the speed ratio is performed by a controller which is constituted by a microcomputer. The controller sets a target speed ratio on the basis of vehicle operating conditions such as the engine rotation speed and throttle opening. Meanwhile, the actual speed ratio is calculated from the rotation speed of the primary pulley and secondary pulley. The amount of oil pressure supplied to the primary pulley and secondary pulley is then increased or decreased such that the actual speed ratio matches the target speed ratio.

In such a belt-drive continuously variable transmission, if for some reason the oil pressure falls temporarily, the holding force of the pulleys in regard to the belt decreases, possibly causing the V-belt to slip along the pulleys.

Tokkai Hei 11-139184, published by the Japan Patent Office in 1999, proposes that in such a case, the engine output torque be reduced in order to decrease the input torque of the transmission.

SUMMARY OF THE INVENTION

However, the belt sometimes slips even when the engine output torque is decreased. To prevent the V-belt from slipping, the oil pressure that is supplied to each of the pulleys may be raised in order to increase the holding force on the V-belt. However, if the V-belt holding force of the pulleys is increased while the V-belt is slipping, the V-belt may become damaged. To avoid such damage, the strength of the V-belt must be raised, leading to inevitable increases in the manufacturing cost of the V-belt.

It is therefore an object of this invention to prevent a V-belt from slipping while avoiding wear to the V-belt.

It is a further object of this invention to secure a minimum required degree of traveling by a vehicle when slippage of the V-belt cannot be stopped.

In order to achieve the above objects, this invention provides a control device for a continuously variable transmission which transmits an output torque of an engine in a vehicle to a drive wheel. The continuously variable transmission comprises a primary pulley which inputs the output torque of the engine, a secondary pulley which outputs a driving torque to the drive wheel, and a V-belt which is wrapped around the primary pulley and secondary pulley. A radius of contact between the V-belt and the primary pulley and secondary pulley is varied in accordance with an oil pressure that is supplied to the primary pulley and secondary pulley respectively.

The control device comprises a throttle which adjusts the output torque of the engine, a device which supplies the oil pressure to the primary pulley and secondary pulley, a sensor which detects slippage of the V-belt, and a programmable controller.

The programmable controller is programmed to operate the throttle to cause the output torque of the engine to decrease while controlling the oil pressure supple device to reduce the oil pressure supplied to the secondary pulley, on the basis of the slippage of the V-belt.

This invention also provides a control method for the above described continuously variable transmission. The method comprises determining slippage of the V-belt, and operating the throttle to cause the output torque of the engine to decrease while controlling the oil pressure supply device to reduce the oil pressure supplied to the secondary pulley, on the basis of the slippage of the V-belt.

The details as well as other features and advantages of this invention are set forth in the remainder of the specification and are shown in the accompanying drawings.

BRIEF DESCRIPTION OF THE DRAWINGS

FIGS. 9A-9G are timing charts illustrating the result of oil pressure control in a belt slippage mode.

FIGS. 10A-10G are timing charts illustrating the result of oil pressure control in a limp-home mode.

DESCRIPTION OF THE PREFERRED EMBODIMENTS

Figure 1:
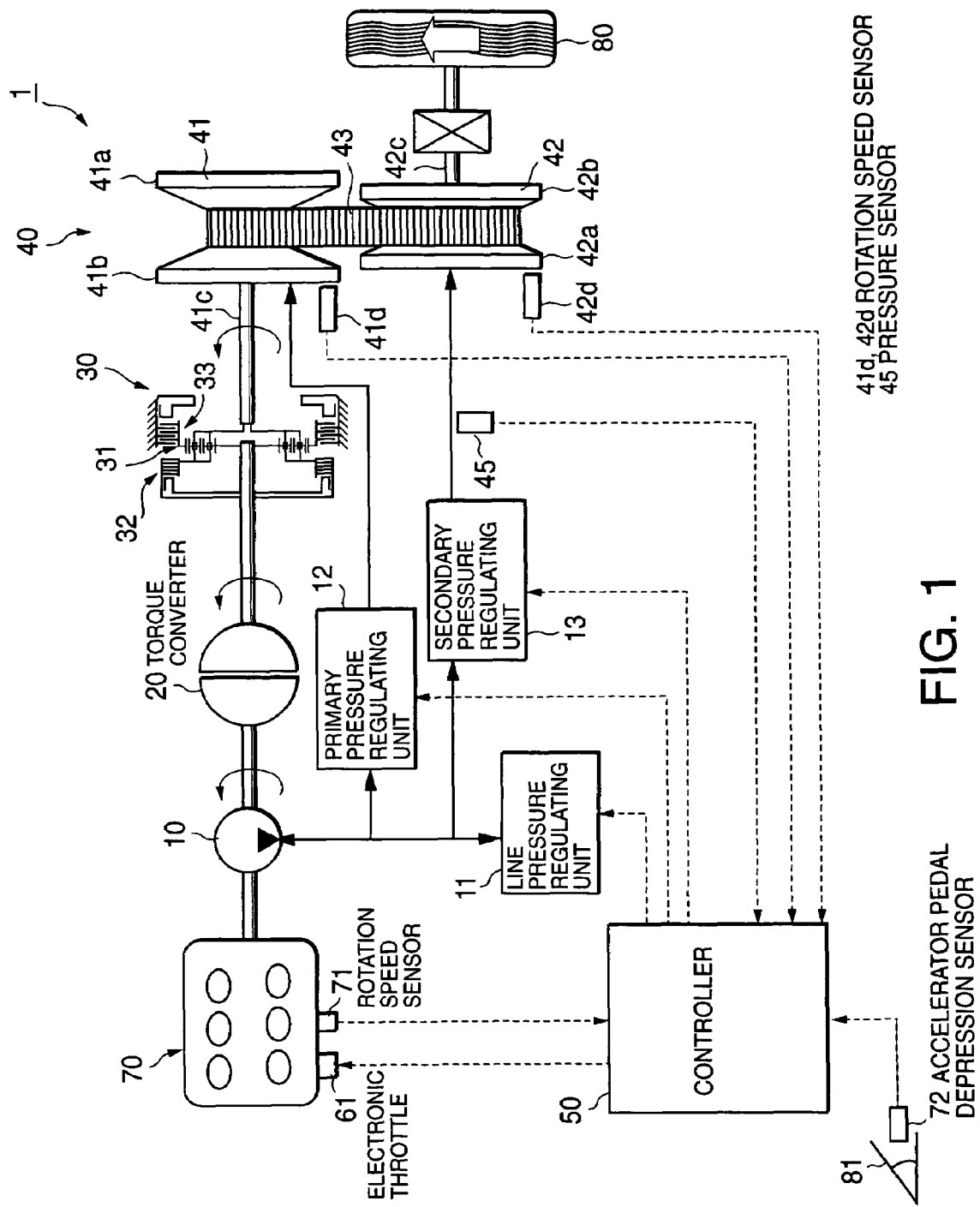
FIG. 1 is a schematic diagram of a control device for a belt-drive continuously variable transmission according to this invention.

Referring to FIG. 1 of the drawings, the output torque of an internal combustion engine 70 installed in a vehicle is transmitted to drive wheels 80 of the vehicle via a torque converter 20, a forward/reverse change-over clutch 30, and a belt-drive continuously variable transmission (hereinafter referred to as CVT) 1. The internal combustion engine 70 also drives a hydraulic pump 10 which serves as an oil pressure source used in the control of the CVT 1.

The torque converter 20 transmits the rotational torque of a pump impeller connected to the engine 70 to a turbine runner by means of a flow of oil. The rotational torque of the turbine runner is input into the forward/reverse change-over clutch 30. The torque converter 20 comprises a lock-up mechanism for preventing relative rotation between the pump impeller and turbine runner.

The forward/reverse change-over clutch 30 comprises a planetary gear set constituted by a sun gear and ring gear, a plurality of planet gears which mesh with these gears, and a carrier which supports the planet gears so as to be capable of orbiting the sun gear. A forward clutch 32 which prevents relative rotation between the carrier and sun gear and a reverse brake 33 which prevents the ring gear from rotating are also provided.

The sun gear is connected to the turbine runner of the torque converter 20. The carrier is connected to an input shaft 41c of the CVT 1.

When the forward clutch 32 is engaged and the reverse brake 33 is disengaged, the carrier rotates integrally with the sun gear such that the rotational torque of the turbine runner is transmitted directly to the input shaft 41c. When the forward clutch 32 is disengaged and the reverse brake 33 is operative, the carrier rotates in the opposite direction to the sun gear, whereby the rotational torque of the turbine runner is transmitted to the input shaft 41c of the CVT 1 in reverse. When the forward clutch 32 and reverse brake 33 are both disengaged, the sun gear and carrier rotate freely relative to each other, and no torque is transmitted.

The CVT 1 is constituted by a primary pulley 41, a secondary pulley 42, and a V-belt 43 wrapped around these pulleys 41 and 42.

The primary pulley 41 comprises a fixed conical plate 41a and a movable conical plate 41b disposed opposite each other. The V-belt 43 engages with a V-shaped groove formed between the plates 41a and 41b. Thrust toward the fixed conical plate 41a is applied to the movable conical plate 41b by oil pressure, and this thrust holds the V-belt 43 inside the groove from both sides. The input shaft 41c is connected to the movable conical plate 41b.

The secondary pulley 42 comprises a fixed conical plate 42b and a movable conical plate 42a disposed opposite each other. The V-belt 43 engages with a V-shaped groove formed by the plates 42a and 42b. Thrust toward the fixed conical plate 42b is applied to the movable conical plate 42a by oil pressure, and this thrust holds the V-belt 43 inside the groove from both sides. The fixed conical plate 42b is connected to the drive wheels 80 via an idler gear and a differential.

Oil pressure generated by the hydraulic pump 10 is adjusted to a predetermined line pressure by a line pressure adjustment device 11. A primary pressure adjustment device 12 adjusts the line pressure to primary pressure which is supplied to the primary pulley 41 to energize the movable conical plate 41b. A secondary pressure adjustment device 13 adjusts the line pressure to secondary pressure which is supplied to the secondary pulley 42 to energize the movable conical plate 42a. The primary pressure pressure-receiving surface area of the movable conical plate 41b and the secondary pressure pressure-receiving surface area of the movable conical plate 42a are set to be substantially equal.

A controller 50 controls the pressure adjustment performed by the line pressure adjustment device 11, primary pressure adjustment device 12, and secondary pressure adjustment device 13 by means of signal output to each of the devices. The controller 50 also controls the output torque of the engine 70 by outputting an opening signal to an electronic throttle 61 comprised in the engine 70. During normal running of the vehicle, the opening signal is determined according to the depression amount of an accelerator pedal 81, but when slippage of the V-belt 43 is detected, the controller 50 performs correction to reduce the opening signal by means of the control to be described below.

The controller is constituted by a microcomputer comprising a central processing unit (CPU), read-only memory (ROM), random access memory (RAM), and an input/output interface (I/O interface). The controller may also be constituted by a plurality of microcomputers.

In order to perform this control, detected values from a rotation speed sensor 71 which detects the rotation speed of the engine 70, an accelerator pedal depression sensor 72 which detects the amount of depression of the accelerator pedal 81, a rotation speed sensor 41d which detects the rotation speed of the primary pulley 42, a rotation speed sensor 42d which detects the rotation speed of the secondary pulley 42, and a pressure sensor 45 which detects the secondary pressure are input respectively into the controller 50 as signals. The rotation speed of the secondary pulley 42 is multiplied by a predetermined coefficient and thus used as the vehicle speed.

On the basis of the vehicle speed, engine rotation speed, and accelerator pedal depression amount, the controller 50 refers to a speed change schedule stored in the memory (ROM) in advance to set a target speed ratio. Meanwhile, the controller 50 calculates the actual speed ratio from the rotation speed of the primary pulley 41 and the rotation speed of the secondary pulley 42. During normal running of the vehicle, the controller 50 maintains the line pressure within a fixed range, and feedback-controls the primary pressure and secondary pressure by means of signal output to the primary pressure adjustment device 12 and secondary pressure adjustment device 13 such that the actual speed ratio matches the target speed ratio.

To prevent slippage of the V-belt 43, the controller 50 executes the routines and subroutines shown in FIGS. 2-8.

Figure 2:
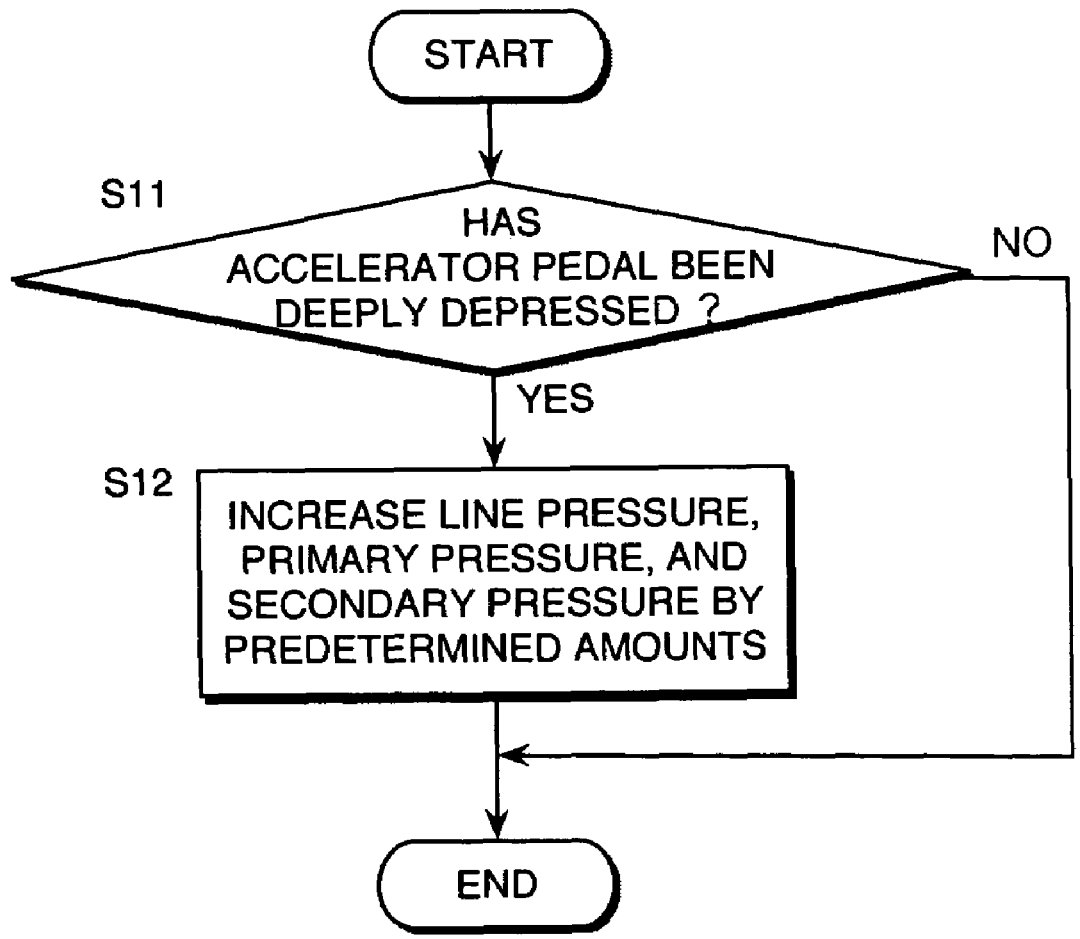
FIG. 2 is a flowchart illustrating a routine for controlling torque transmission capacity, which is executed by a controller according to this invention.

FIG. 2 shows a routine for controlling the torque transmission capacity of the V-belt 43. The controller 50 executes this routine during an operation of the engine 70 at intervals of ten milliseconds.

In a step S11, the controller 50 determines from variation in the accelerator pedal depression amount whether or not the accelerator pedal 81 has been depressed deeply If the accelerator pedal 81 has been depressed deeply the controller 50 increases the line pressure, primary pressure, and secondary pressure respectively by predetermined amounts in a step S12.

If the accelerator pedal 81 has not been depressed deeply, and also following the processing of the step S12, the controller 50 ends the routine.

When the accelerator pedal 81 is depressed deeply, the output torque of the engine 70 increases largely, and accordingly the torque transmission amount of the V-belt 43 increases largely. The object of this routine is to prevent slippage of the V-belt 43 due to a large increase in the torque transmission amount by raising the primary pressure and secondary pressure in advance so as to increase the holding force of the primary pulley 41 and secondary pulley 42 on the V-belt 43. Increasing the line pressure in the step S12 allows the primary pressure and secondary pressure to be increased.

Figure 3:
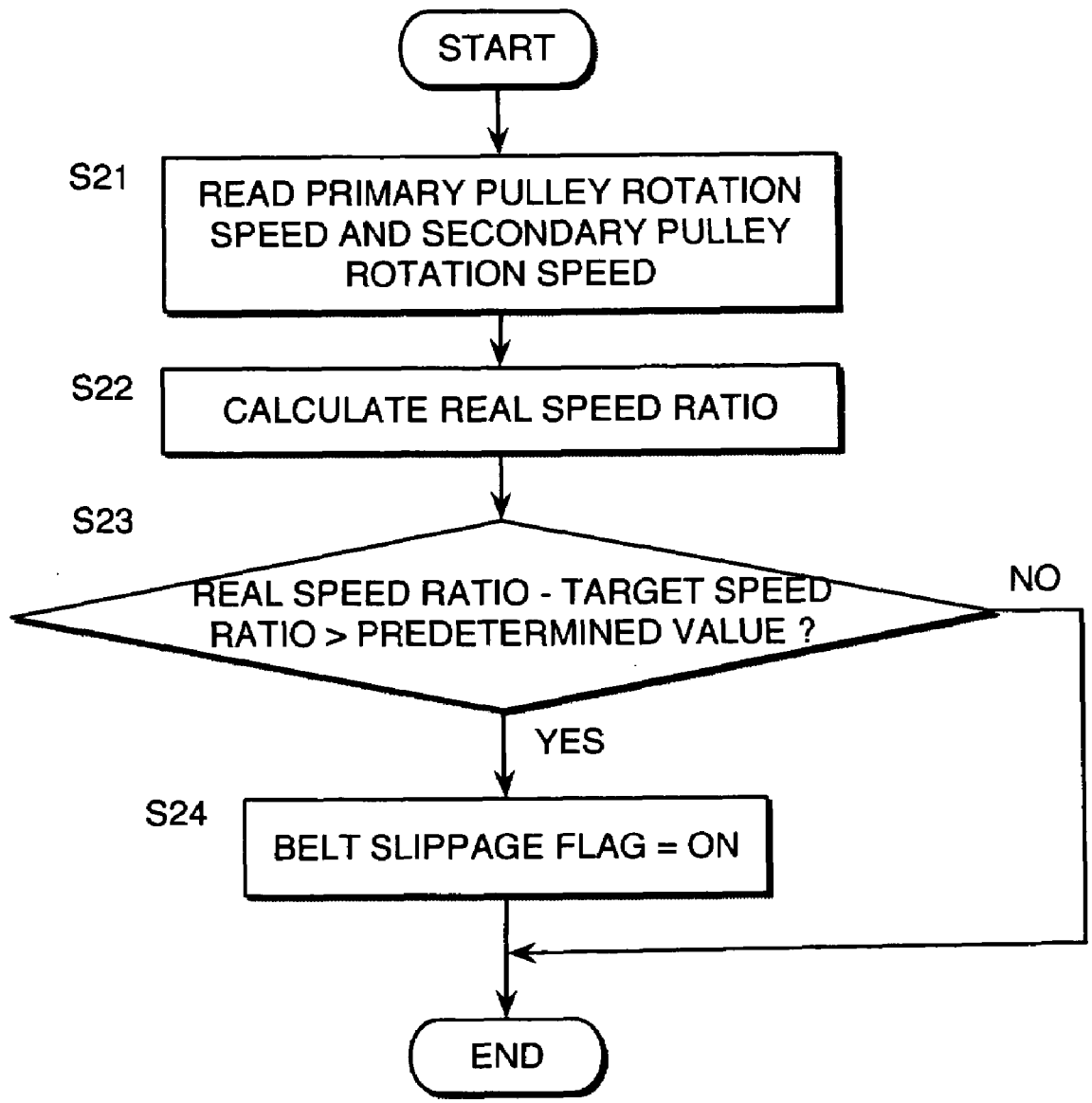
FIG. 3 is a flowchart illustrating a routine executed by the controller for detecting belt slippage.

FIG. 3 shows a routine for determining whether or not slippage of the V-belt 43 has occurred. The controller 50 executes this routine at ten millisecond intervals during an operation of the engine 70 and when the belt slippage suppression routine and torque limit value releasing routine to be described below are not under execution.

First, in a step S21, the controller 50 reads the rotation speed of the primary pulley 41 and the rotation speed of the secondary pulley 42 from input signals from the rotation speed sensors 41d and 42d.

Next, in a step S22, the controller 50 calculates the actual speed ratio of the CVT 1 from the rotation speed of the primary pulley 41 and the rotation speed of the secondary pulley 42.

Next, in a step S23, the controller 50 determines whether or not the difference between the actual speed ratio and target speed ratio is larger than a predetermined value. The predetermined value is set to correspond to ten percent of the target speed ratio.

If the difference between the actual speed ratio and target speed ratio is larger than the predetermined value, the controller 50 switches a belt slippage flag ON in a step S24. The initial value of the belt slippage flag is set to OFF. Following the processing of the step S24, the controller 50 ends the routine.

If the difference between the actual speed ratio and target speed ratio is not larger than the predetermined value, the routine ends with no further processing.

Figure 4:
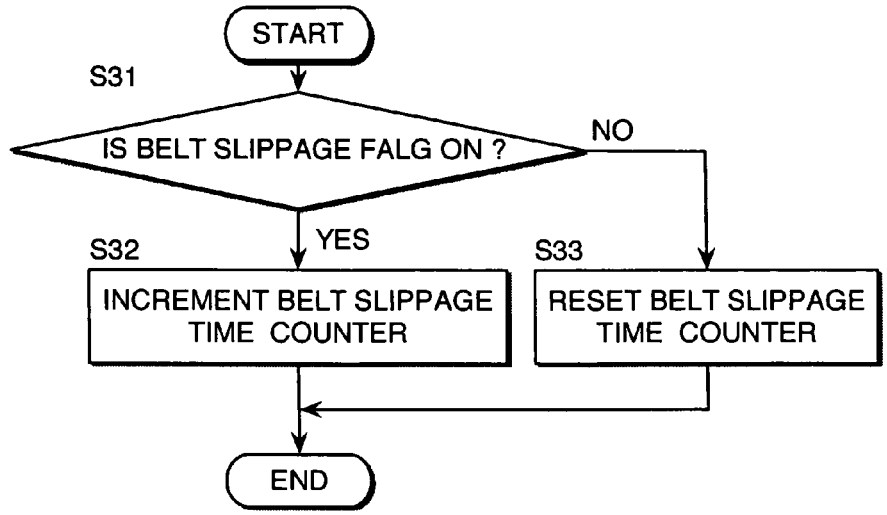
FIG. 4 is a flowchart illustrating a routine executed by the controller for calculating a belt slippage time.

FIG. 4 illustrates a routine for calculating the belt slippage time. The execution conditions for this routine are identical to the execution conditions for the routine in FIG. 3.

First, in a step S31, the controller 50 determines whether or not the belt slippage flag is ON.

If the belt slippage flag is ON, in a step S32 the controller 50 increases the value of a belt slippage time counter by an increment corresponding to the routine execution interval. The initial value of the belt slippage time counter is set to zero.

If the belt slippage flag is not ON, then the controller 50 resets the belt slippage time counter to zero in a step S33.

Following the processing of the step S32 or S33, the controller 50 ends the routine.

Figure 5:
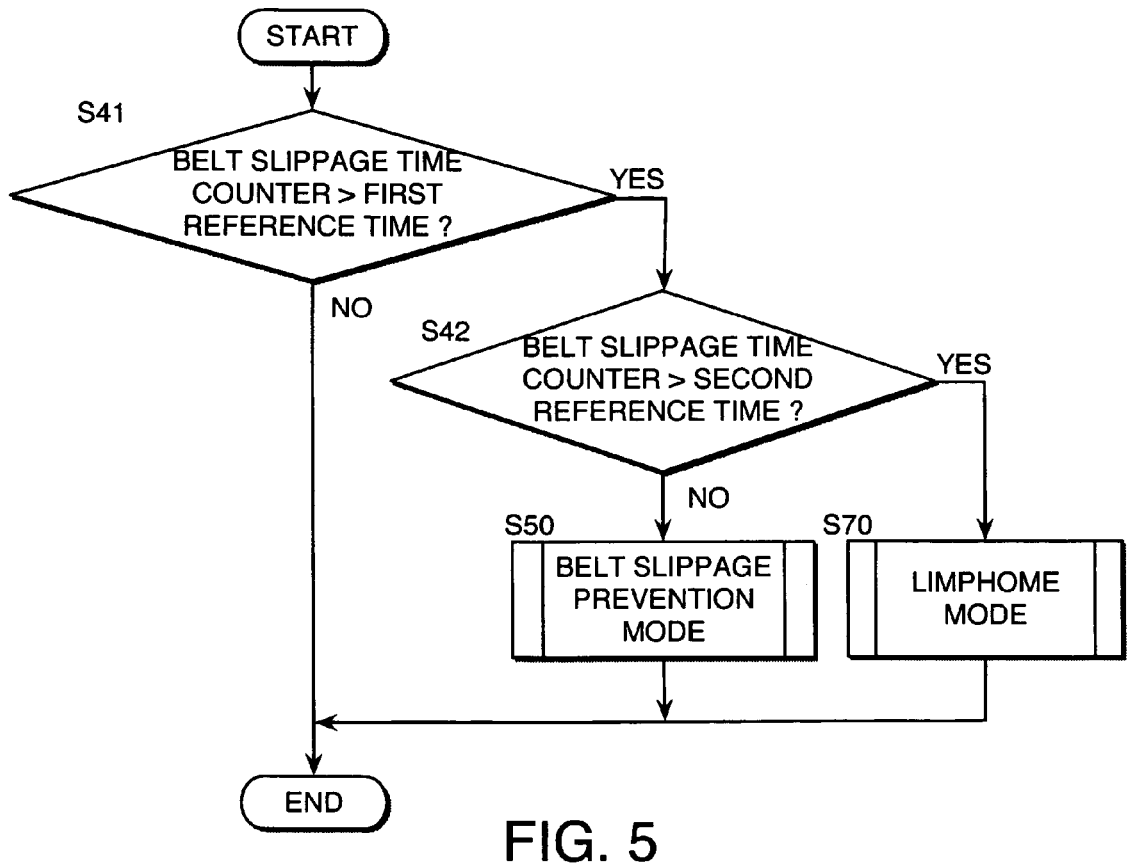
FIG. 5 is a flowchart illustrating a routine executed by the controller for suppressing belt slippage.

FIG. 5 shows a belt slippage suppression routine. This routine is executed at ten millisecond intervals only when the engine 70 is operative and the belt slippage flag is ON. It should be noted that during execution of this routine, the aforementioned feedback control of the speed ratio to the target speed ratio is not executed.

First, in a step S41, the controller 50 determines whether or not the value of the belt slippage time counter has reached a first reference time. The first reference time is set to 0.2 seconds.

If the value of the belt slippage time counter has not reached the first reference time, the controller 50 ends the routine immediately without executing the processing in the subsequent steps. In this case, the primary pressure and secondary pressure are maintained at their respective pressures prior to execution of the routine.

If the value of the belt slippage time counter has reached the first reference time, in a step S42 the controller 50 determines whether or not the value of the belt slippage time counter has reached a second reference time. The second reference time is set to 0.4 seconds.

Figure 6:
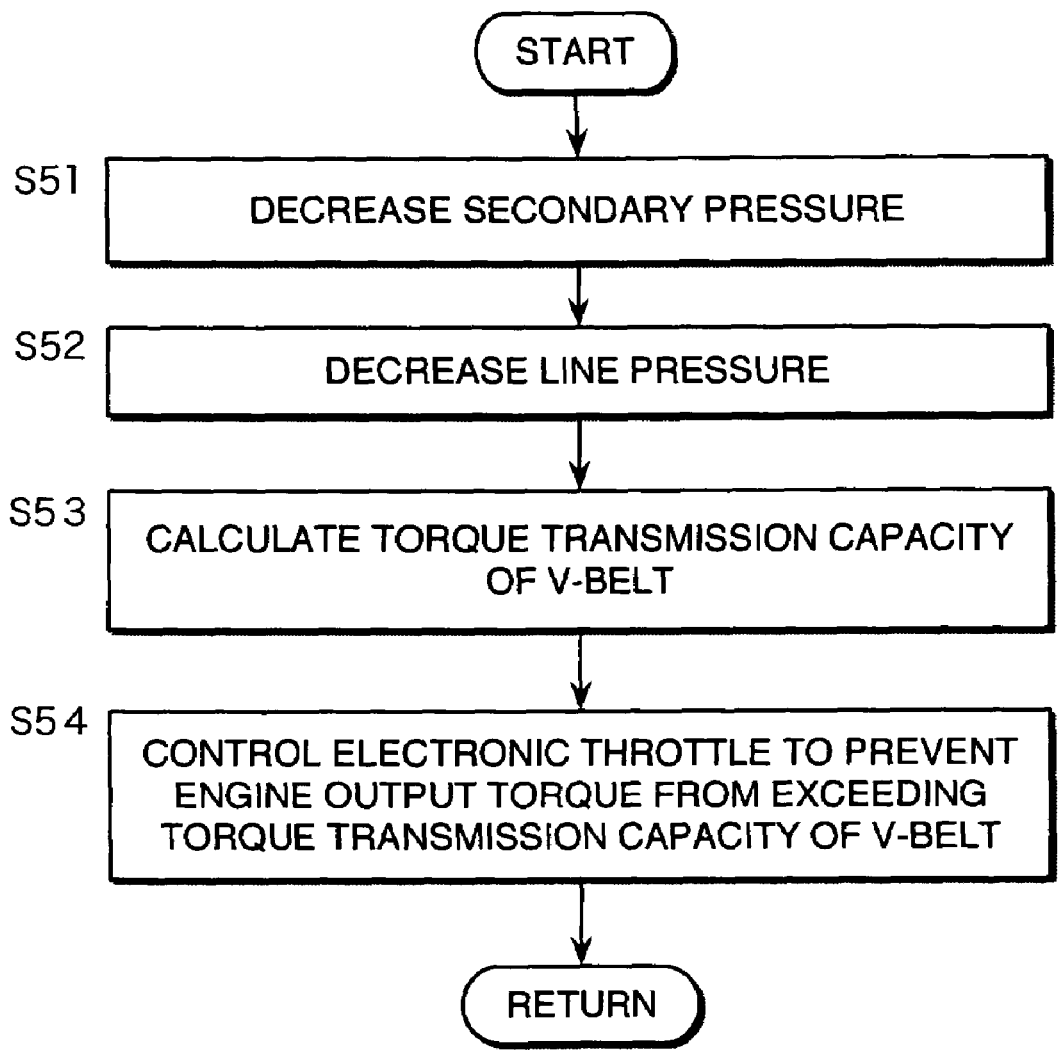
FIG. 6 is a flowchart illustrating a subroutine executed by the controller in the routine in FIG. 5 for decreasing the oil pressure and engine torque.

If the value of the belt slippage time counter has not reached the second reference time, in a step S50 the controller 50 executes a subroutine shown in FIG. 6 for reducing the oil pressure and engine torque.

Figure 8:
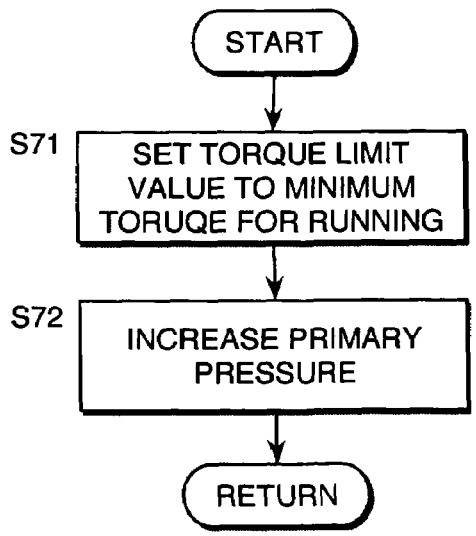
FIG. 8 is a flowchart illustrating a limp-home operation subroutine executed by the controller in the routine in FIG. 5.

If the value of the belt slippage time counter has reached the second reference time, in a step S70 the controller 50 executes a limp-home operation subroutine shown in FIG. 8.

Following the processing of the step S50 or S70, the controller 50 ends the routine.

Next, referring to FIG. 6, the oil pressure and engine torque reduction subroutine will be described.

First, in a step S51, the controller 50 reduces the secondary pressure until the V-belt holding force of the secondary pulley 42 has reached a predetermined holding force. The predetermined holding force is set in advance on the basis of the mechanical strength of the V-belt 43 such that the V-belt 43 does not suffer damage.

To describe the mechanical strength of the V-belt 43, the V-belt 43 is constituted from a large number of elements fastened by a hinge. When there is no slippage between the V-belt 43 and the pulleys, the V-belt 43 possesses great structural strength in relation to the holding force of the pulleys. When slippage occurs, however, the hinge becomes diagonal to the conical plates in accordance with the difference in the degree of slippage between the V-belt 43 and the conical plates on each side, causing the V-belt 43 to be damaged at a smaller holding force.

The predetermined holding force indicates a holding force at which the V-belt 43 does not suffer damage even when slippage occurs. Hence the predetermined holding force is smaller than the upper holding force limit during a normal operation.

The reason for reducing the secondary pressure in the step S51 is as follows.

In a normal vehicle, the probability of the transmission transmitting the rotation of the engine to the drive wheels at a reduced speed is high. This means that in the CVT 1, the contact radius between the secondary pulley 42 and V-belt 43 is larger than the contact radius between the primary pulley 41 and V-belt 43, and the angular range in which the secondary pulley 42 and V-belt 43 contact is larger than the angular range in which the primary pulley 41 and V-belt 43 contact.

As a result, the contact pressure per unit area between the secondary pulley 42 and the V-belt 43 tends to be smaller than that between the primary pulley 41 and the V-belt 43, and hence the probability of slippage occurring between the secondary pulley 42 and V-belt 43 is higher than the probability of slippage between the primary pulley 41 and V-belt 43.

Therefore, by first reducing the secondary pressure, the V-belt 43 can be prevented from damage.

Next, in a step S52, the controller 50 reduces the line pressure. Reducing the line pressure secures the reduction in the secondary pressure. By reducing the line pressure, the primary pressure also decreases.

Next, in a step S53, the controller 50 calculates the torque that can be transmitted without causing the V-belt 43 to slip, or in other words the torque transmission capacity, from the reduced primary pressure and secondary pressure. The resulting value is set as a torque limit value for limiting the output torque of the engine 70.

Next, in a step S54, the opening of the electronic throttle 61 is adjusted such that the output torque of the engine 70 does not exceed the torque limit value.

Following the processing of the step S54, the controller 50 ends the subroutine.

Next, referring to FIG. 8, the limp-home operation subroutine will be described.

This routine is executed in cases where slippage of the V-belt 43 continues even when the belt slippage prevention subroutine of FIG. 6 has been executed repeatedly from the first reference time to the second reference time in FIG. 5. Accordingly, in this case it is perceived that the CVT 1 is malfunctioning in some manner.

In a step S71, the controller 50 sets the torque limit value to the minimum torque at which the vehicle can travel under its own power, and reduces the opening of the electronic throttle 61 such that the output torque of the engine 70 does not exceed the torque limit value. Here, the minimum torque enabling the vehicle to travel under its own power is set at fifty newton meters (Nm).

Next, in a step S72, the controller 50 increases the primary pressure such that the speed ratio of the CVT 1 decreases, or in other words changes to the high-speed side. Following the processing of the step S72, the controller 50 ends the routine.

By controlling the engine 70 to a small output torque required for the vehicle to travel under its own power to a maintenance shop or the like, for example, and maintaining the speed ratio on the high-speed side, this subroutine reduces the transmission torque of the CVT 1, and thus prevents damage to the CVT 1.

Figure 7:
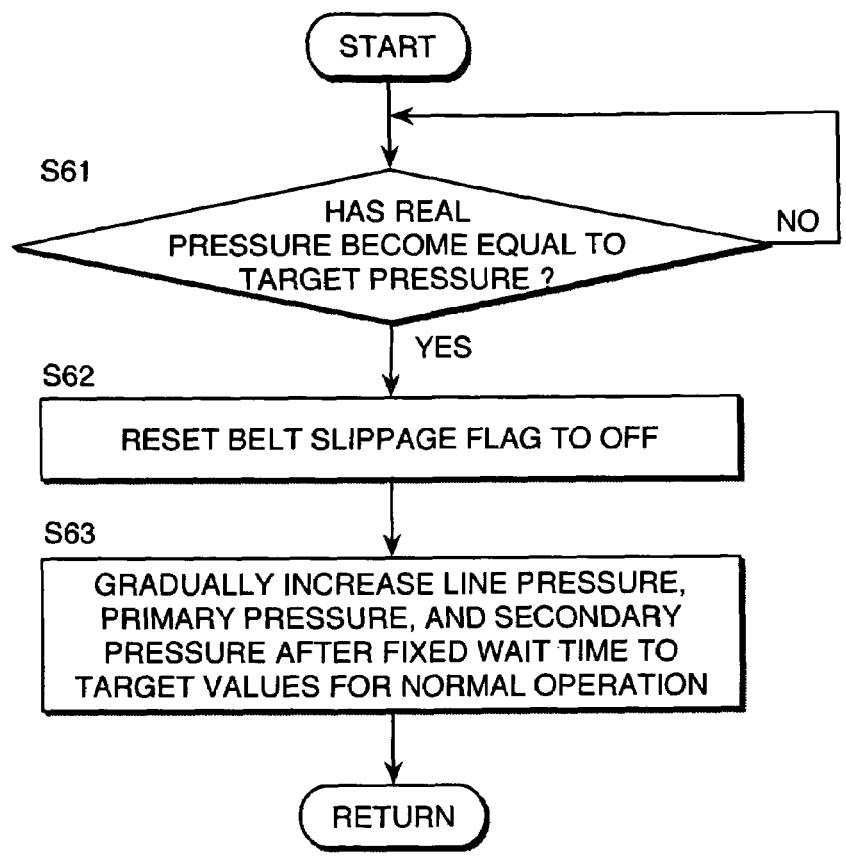
FIG. 7 is a flowchart illustrating a routine for releasing a torque limit value, which is executed by the controller following the cessation of belt slippage.

FIG. 7 shows a routine for releasing the torque limit value. Implementation of this routine begins in parallel with the beginning of execution of the routine in FIG. 5. It should be noted, however, that this routine is implemented only once rather than cyclically.

First, in a step S61, the controller 50 determines whether or not the actual secondary pressure detected by the pressure sensor 45 matches a target secondary pressure. The target secondary pressure is an instructed pressure which is output to the secondary pressure adjustment device 13 in the routine in FIG. 5.

If the actual secondary pressure does not match the target secondary pressure, the controller 50 waits until the actual secondary pressure matches the target secondary pressure. Hence the substantial processing of this routine begins once the actual secondary pressure has matched the target secondary pressure as a result of the execution of the routine in FIG. 5.

Once the actual secondary pressure has matched the target secondary pressure, the controller 50 switches the belt slippage flag OFF in a step S62.

Next, in a step S63, the line pressure, primary pressure, secondary pressure, and torque limit value are increased gradually to their normal operation target values after a predetermined waiting period. Following the processing of the step S62, the controller 50 ends the routine.

Next, referring to FIGS. 9A-9G and FIGS. 10A-10G, the ways in which execution of the routines and subroutines in FIGS. 2-8 by the controller 50 acts on the CVT 1 will be described.

FIGS. 9A-9G show a case in which normal conditions are restored following belt slippage in the CVT 1. FIGS. 10A-10G show a case in which a limp-home operation is performed when belt slippage in the CVT 1 cannot be halted. In the drawings, the solid lines indicate target values output by the controller 50 in relation to the pressure, speed ratio, and so on, and the broken lines indicate actual values.

Referring to FIGS. 9A-9G, first, when the accelerator pedal 81 is depressed at a time t0 while the vehicle is running normally, the controller 50 increases the opening TVO of the electronic throttle 61 as shown in FIG. 9A in order to increase the output torque of the engine 70. Note that the target speed ratio varies in accordance with the depression amount of the accelerator pedal 81, but here the target speed ratio varies at a slight delay to variation in the depression amount of the accelerator pedal 81, and it is assumed that the pressure control described above is performed during this delay period.

Simultaneously, through execution of the routine in FIG. 2, the controller 50 outputs signals to the line pressure adjustment device 11, primary pressure adjustment device 12, and secondary pressure adjustment device 13 instructing pressure increases in each.

At this time, the secondary pressure may not rise to the instructed pressure for some reason, as shown in FIG. 9C. Meanwhile, the output torque of the engine 70 increases, and hence the holding force of the secondary pulley 42 on the V-belt 43 becomes insufficient, causing the V-belt 43 to slip in relation to the secondary pulley 42. As a result, the actual speed ratio begins to deviate to the increasing side, as shown by the broken line in FIG. 9E.

Through execution of the routine in FIG. 3, the controller 50 calculates the actual speed ratio, and in the step S23 determines whether or not the difference between the actual speed ratio and target speed ratio is larger than the predetermined value.

Then, when the deviation between the actual speed ratio and target speed ratio becomes larger than the predetermined value at a time t1, the controller 50 switches the belt slippage flag ON in the step S24, as shown in FIG. 9F. Simultaneously, counting by the belt slippage time counter is begun by executing the routine in FIG. 4. Execution of the routine in FIG. 5 begins concurrently.

As shown in FIG. 9E, the determination in the step S41 of FIG. 5 becomes positive at a time t2, when slippage of the V-belt 43 has continued from the time t1 to the first reference time of 0.2 seconds. At this point in time, the determination in the step S42 is negative, and hence the controller 50 executes the belt slippage prevention subroutine shown in FIG. 6 in the step S50. Accordingly, the line pressure shown in FIG. 9B, the secondary pressure shown in FIG. 9C, and the torque limit value shown in FIG. 9D all decrease from the time t2 onward. The primary pressure, which is not shown in the drawings, also falls.

As a result of the reduction in the torque limit value, the output torque of the engine 70 decreases, and accordingly the transmission torque of the V-belt 43 also decreases. Meanwhile, a reduction in the secondary pressure is instructed, causing the actual secondary pressure to near the target secondary pressure as shown in FIG. 9C. As a result, slippage of the V-belt 43 is reduced from the time t2 onward.

When the actual secondary pressure equals the target secondary pressure at a time t3, the determination in the step S61 of FIG. 7 becomes positive, and the processing of the step S62 onward is begun. At the same time as the actual secondary pressure equals the target secondary pressure, slippage of the V-belt 43 is halted.

In the step S62, the controller 50 resets the belt slippage flag to OFF, and from a time t4, following a predetermined waiting period, the line pressure, primary pressure, secondary pressure, and torque limit value are gradually increased to their target values during a normal operation.

Hence according to this control device, when slippage of the V-belt 43 occurs in the CVT 1, the instructed pressure for the oil pressure that is supplied to each part of the CVT 1, including the secondary pressure, is reduced such that the actual oil pressure and instructed pressure match. Simultaneously, the output torque of the engine 70 is reduced to a torque limit value which corresponds to the reduced instructed pressure. As a result, slippage of the V-belt 43 can be stopped quickly. After stopping slippage of the V-belt 43 in this manner, the speed ratio of the CVT 1 is controlled to a normal operation target speed ratio.

Referring to FIGS. 10A-10G, the situation up to the time t2 is identical to that in FIGS. 9A-9G. Here, as shown in FIG. 10E, deviation between the actual speed ratio and target speed ratio continues to rise above the predetermined value even after the time t2 at which the line pressure, primary pressure, secondary pressure, and torque limit value are reduced. If the deviation between the actual speed ratio and target speed ratio is still larger than the predetermined value at a time t5, indicating that the second reference time from the time t1 has passed, the controller 50 executes the limp-home operation subroutine in the step S70 of FIG. 5.

By executing the limp-home operation subroutine in FIG. 8, the torque limit value is set to the minimum torque at which the vehicle can travel under its own power as shown in FIG. 10D, and the primary pressure is increased. As a result, the actual speed ratio changes to the high-speed side, and both the output torque of the engine 70 and the transmission torque of the CVT 1 decrease.

In this condition, the vehicle obtains the minimum vehicle driving force required to travel under its own power.

By reducing the output torque of the engine 70 and the transmission torque of the CVT 1 in this manner, the vehicle can travel to a maintenance shop while slippage of the V-belt 43 is suppressed to the greatest extent possible.

To summarize the control described above, when the accelerator pedal 81 is depressed, the V-belt holding force of the primary pulley 41 and secondary pulley 42 is strengthened. If, at this time, the V-belt 43 slips for the first reference time, the output torque of the engine 70, the secondary pressure, and the line pressure are reduced, whereby slippage of the V-belt 43 is stopped. Once the slippage has been stopped, normal speed change control is restored. If, on the other hand, the V-belt 43 continues to slip beyond a second reference time, it is presumed that the CVT 1 is malfunctioning in some manner, and hence the output torque of the engine 70 is reduced further and the speed ratio is changed to the high-speed side so as to realize the minimum driving force required for the vehicle to travel under its own power.

Hence, according to this invention, a V-belt can be prevented from slipping in such a manner that the V-belt does not suffer damage, and when slippage of the V-belt cannot be stopped, a minimum required degree of traveling can be secured in the vehicle while preventing damage to the V-belt.

The contents of Tokugan 2003-114032, with a filing date of Apr. 18, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiment, the slippage of the V-belt is detected by two sensors 41d, 42d, but it is possible to detect the same by a single The embodiments of this invention in which an exclusive property or privilege is claimed are defined as follows:

What is claimed is:

1. A control device for a continuously variable transmission which transmits an output torque of an engine in a vehicle to a drive wheel, the continuously variable transmission comprising a primary pulley which inputs the output torque of the engine, a secondary pulley which outputs a driving torque to the drive wheel, and a V-belt which is wrapped around the primary pulley and secondary pulley, wherein a radius of contact between the V-belt and the primary pulley and secondary pulley is varied in accordance with an oil pressure that is supplied to the primary pulley and secondary pulley respectively, the control device comprising:

an output torque adjusting device which adjusts the output torque of the engine;
an oil pressure supplying device which supplies the oil pressure to the primary pulley and secondary pulley;
a sensor which detects slippage of the V-belt; and
a programmable controller programmed to:
  operate the output torque adjusting device to cause the output torque of the engine to decrease while controlling the oil pressure supplying device to reduce the oil pressure supplied to the secondary pulley, on the basis of the slippage of the V-belt.

2. The control device as defined in claim 1, wherein the secondary pulley comprises a pair of conical plates which hold the V-belt from both sides in accordance with the supplied oil pressure, and the controller is further programmed to control the oil pressure supplying device to reduce the oil pressure supplied to the secondary pulley, when slippage of the V-belt is detected, until a holding force of the conical plates on the V-belt reaches a predetermined holding force.

3. The control device as defined in claim 2, wherein the predetermined holding force is a value that is set in advance on the basis of a mechanical strength of the V-belt under slippage.

4. The control device as defined in claim 2, wherein the primary pulley comprises a pair of conical plates which hold the V-belt from both sides in accordance with the supplied oil pressure, the oil pressure supplying device comprises a line pressure adjustment device which generates a predetermined line pressure, a primary pressure adjustment device which adjusts the line pressure to a primary pressure that is supplied to the primary pulley, and a secondary pressure adjustment device which adjusts the line pressure to a secondary pressure that is supplied to the secondary pulley, and the controller is further programmed to control the line pressure adjustment device, primary pressure adjustment device, and secondary pressure adjustment device to reduce all of the line pressure, the primary pressure, and the secondary pressure when slippage of the V-belt is detected.

5. The control device as defined in claim 4, wherein the vehicle comprises an accelerator pedal, the control device further comprises a sensor which detects a depression amount of the accelerator pedal, and the controller is further programmed to control the line pressure adjustment device, primary pressure adjustment device, and secondary pressure adjustment device to increase all of the line pressure, the primary pressure, and the secondary pressure in accordance with an increase in the depression amount of the accelerator pedal.

6. The control device as defined in claim 2, wherein the controller is further programmed to calculate a transmittable torque that can be transmitted by the V-belt under the predetermined holding force, and to operate the output torque adjusting device to reduce the output torque of the engine to a level equal to or smaller than the transmittable torque.

7. The control device as defined in claim 1, wherein the controller is further programmed to prevent the output torque adjusting device from reducing the output torque of the engine and to prevent the oil pressure supplying device from reducing the oil pressure supplied to the secondary pulley until the slippage of the V-belt detected by the sensor continues for a predetermined first reference time.

8. The control device as defined in claim 7, wherein, when the slippage of the V-belt detected by the sensor continues for a second reference time which is greater than the first reference time, the controller is further programmed to operate the output torque adjusting device to further reduce the output torque of the engine, and to control the oil pressure supplying device to increase the oil pressure supplied to the primary pulley.

9. The control device as defined in claim 1, wherein the controller is further programmed to determine whether or not the slippage of the V-belt has stopped, and to gradually increase the reduced output torque of the engine when the slippage of the V-belt has stopped.

10. The control device as defined in claim 9, wherein the control device further comprises a sensor which detects an actual oil pressure supplied to the secondary pulley, and the controller is further programmed to determine that the slippage of the V-belt has stopped when the actual oil pressure matches an oil pressure that the controller has commanded to the oil pressure supplying device.

11. A control device for a continuously variable transmission which transmits an output torque of an engine in a vehicle to a drive wheel, the continuously variable transmission comprising a primary pulley which inputs the output torque of the engine, a secondary pulley which outputs a driving torque to the drive wheel, and a V-belt which is wrapped around the primary pulley and secondary pulley, wherein a radius of contact between the V-belt and the primary pulley and secondary pulley is varied in accordance with an oil pressure that is supplied to the primary pulley and secondary pulley respectively, the control device comprising:

means for adjusting the output torque of the engine;
means for supplying the oil pressure to the primary pulley and secondary pulley;
means for detecting slippage of the V-belt; and
means for operating the output torque adjusting means to cause the output torque of the engine to decrease while controlling the oil pressure supply means to reduce the oil pressure supplied to the secondary pulley, on the basis of the slippage of the V-belt.

12. A control method for a continuously variable transmission which transmits an output torque of an engine in a vehicle to a drive wheel, the engine comprising an output torque adjusting device which adjusts the output torque of the engine, the continuously variable transmission comprising a primary pulley which inputs the output torque of the engine, a secondary pulley which outputs a driving torque to the drive wheel, and a V-belt which is wrapped around the primary pulley and secondary pulley, wherein a radius of contact between the V-belt and the primary pulley and secondary pulley is varied in accordance with an oil pressure that is supplied from an oil pressure supplying device to the primary pulley and secondary pulley respectively, the control method comprising:

determining slippage of the V-belt; and
operating the output torque adjusting device to cause the output torque of the engine to decrease while controlling the oil pressure supplying device to reduce the oil pressure supplied to the secondary pulley, on the basis of the slippage of the V-belt.

* * * * *